Sept. 30, 1969      R. J. BACON      3,469,376
BAFFLING FOR ROTARY MOWER
Filed April 20, 1967
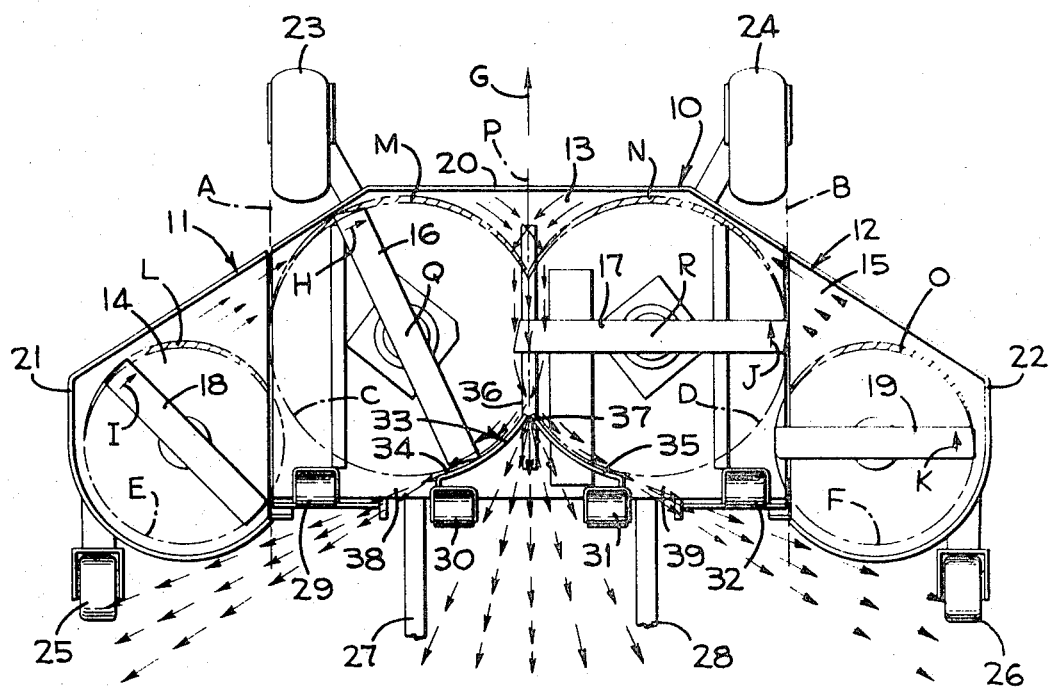
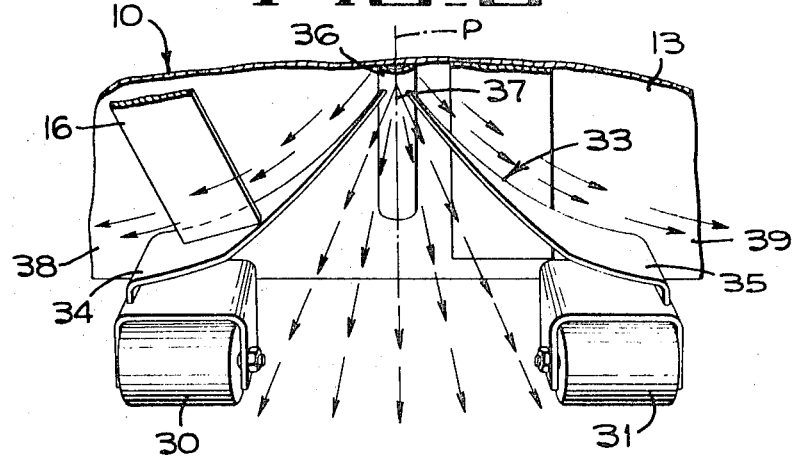
INVENTOR.
ROGER J. BACON
BY
*Francis W. Anderson*
ATTORNEY

United States Patent Office 3,469,376
Patented Sept. 30, 1969

3,469,376
BAFFLING FOR ROTARY MOWER
Roger J. Bacon, Port Washington, Wis., assignor to FMC Corporation, San Jose, Calif., a corporation of Delaware
Filed Apr. 20, 1967, Ser. No. 632,405
Int. Cl. A01d 35/26, 75/30
U.S. Cl. 56—6                    4 Claims

ABSTRACT OF THE DISCLOSURE

A sectionalized grass mower distributes grass clippings evenly over a wide area. The mower has a depending skirt at the sides and front. Two side-by-side blades are suspended from the center base section of the mower. A V-shaped baffle depends from the center base section and has an apex on an imaginary line extending between the blades thereof. The baffle has a central opening, and each side plate of the baffle, which slants rearwardly as it extends outwardly from the apex, terminates at a rear opening spaced from the central opening in the baffle.

---

The present invention relates to rotary grass mowers and, more particularly, to the distribution of grass clippings therefrom.

In rotary mowers having no grass catching apparatus, the cut grass clippings frequently tend to fall in rows which are unsightly. Accordingly, some mowers have baffle plates depending therefrom to guide the grass clippings into a more desirable pattern.

In the present invention, a baffle arrangement is provided which tends to discharge the grass from the rear of the mower over a wider area and prevents the formation of rows of cut grass. In brief, in the preferred form of the invention, a pair of side-by-side blades depend from the central base member of a sectionalized mower for rotation in opposte directions, the inner sides of the blades sweeping rearwardly. A V-shaped baffle has an apex on an imaginary line extending longitudinally between the blades. The baffle has two spaced guide plates with a central opening therebetween, the guide plates slanting rearwardly as they extend outwardly from the apex. Each guide plate terminates at an opening at the rear of the central base member spaced from the central opening.

As grass is cut and propelled rearwardly between the axes of the blades, a portion of it will pass through the central opening. Other portions, however, will be guided by each baffle plate, respectively, through the other rear openings to spread the grass clippings over a relatively wide area.

In the sectionalized mower, a depending skirt surrounds the front and sides of the mower. Grass clippings cut by blades on the side sections of the mower are carried forwardly around the axes of the blades on the center base section, and thrust rearwardly between the axes of the center section blades, with the grass cut by the two blades of the center section.

It is therefore the object of the present invention to provide a baffle in a mower to distribute the grass clippings over a wide area.

In the drawings:
FIGURE 1 is a view of the underside of a sectionalized grass mower with baffling constructed in accordance with the present invention; and
FIGURE 2 is an enlarged view in perspective of the baffle at the rear of the mower.

There is shown in FIGURE 1 the underside of a grass mower having a central section 10, and two wing sections 11, 12, pivotally connected to the central section for pivotal movement relative thereto about longitudinal axes A and B, respectively. The central section of the mower has a base member 13, and the two wing sections have base members 14 and 15. The center section 10 of the mower has two blades 16, 17, depending below the base member 13, which are driven in overlapping orbits C, D and which are synchronized to avoid interference. Each wing section has a blade 18, 19, respectively, which are driven in orbits E, F. The orbits E, F do not overlap the orbits C, D, but the blades cut swaths which overlap the swaths cut by blades 16 and 17 when the mower is pushed in the directional sense indicated by arrow G. The center section has a skirt 20 depending from the front edge of the base member 13 thereof. The wing sections have skirts 21, 22 depending from the rear, outboard side, and front edges of the base members 14, 15 thereof.

The center section 10 of the mower has two front ground engaging wheels 23, 24, and the two wing sections have outboard ground engaging wheels 25, 26. The mower is connected by two frame members 27, 28 to a tractor (not shown) for mowing. The base member 13 has four rollers 29, 30, 31 and 32 depending from the rear edge thereof. When the mower is connected to the tractor, the four rollers 29, 30, 31, 32, which support the mower when it is detached from the tractor, are off the ground. During mowing operations in which the mower is on level ground, the four blades 16, 18, 18, 19 rotate in a common plane. The two left hand blades 16, 18 rotate clockwise (as viewed in FIGURE 1) as indicated by arrows H, I; the two right hand blades 17, 19 rotate counterclockwise (as viewed in FIGURE 1), as indictaed by arrows J, K.

During a given incremental advance of the mower, grass is cut in the areas L, M, N, and O indicated by cross-hatching in FIGURE 1. The grass from areas L and O is swept, by rotation of the blades, forwardly and inwardly to combine with the grass clippings from areas M and N. All these clippings are then swept rearwardly along an imaginary line, indicated at P, extending between the axes Q, R of the blades 16, 17.

If no baffling were provided for these grass clippings, the clippings would be discharged in unsightly rows. In order to eliminate the formation of rows of grass, the baffle 33 shown in FIGURE 2 has been provided. The baffle 33 is V-shaped and comprises two guide plates 34 and 35, one on each side of the line P which bisects the central mower section. Each guide plate is attached to a rib 36 on the underside of the base member 13 on line P and each is slanted rearwardly as it extends away from the rib 36. Each guide plate is wide at its outer, rearward end to deflect the major portion of the grass encountered. Each guide plate narrows as it extends inwardly and forwardly, thereby deflecting a lesser portion of the grass encountered. At the rib 36, the guide plates, which are spaced apart a small distance, are so narrow that they deflect an insignificant amount of grass clipping. Thus, an opening 37 is defined between the guide plates which passes a significant portion (say ⅓ to ½) of the grass passed rearwardly between the axes of blades 16 and 17. The remainder of the grass is deflected laterally by the guide plates, passing through openings 38, 39 between the rollers 29, 30 and under frame member 27 on the left (as viewed in FIGURE 1), and between the rollers 31, 32 and under frame member 28 on the right (as viewed in FIGURE 1).

Thus, the grass is distributed evenly behind the mower, and no unsightly rows of clipped grass are deposited.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. In a grass mower,
   (a) a base,
   (b) a pair of blades suspended from the base for side-by-side rotation,
   (c) a guide plate suspended from the base on each side of an imaginary longitudinal line extending between the blades, said guide plates defining a central opening therebetween, said guide plates located at the rear of the base and slanted rearwardly as they extend away from said line, each of said guide plates terminating at an opening spaced from said central opening to laterally spread the grass thrust rearwardly by said blades.

2. The grass mower of claim 1 in which said blades rotate in opposite directions with each side of each blade sweeping rearwardly at said line.

3. In a grass mower,
   (a) a base,
   (b) a pair of power driven blades suspended from the base for side-by-side rotation in opposite directions, the inner sides of both blades sweeping rearwardly,
   (c) a generally V-shaped baffle depending from the base and having an apex on an imaginary longitudinal line extending between the blades, said baffle extending rearwardly from said apex, said baffle having a central opening and defining spaced apart guide plates on each side of said opening, each of said guide plates terminating at a rear opening spaced laterally from said central opening to laterally spread the grass thrust rearwardly by said blades.

4. In a grass mower,
   (a) a sectionalized base comprising a central base section and a side base section pivotally cinnected to each side of the central base section,
   (b) a skirt depending from the sides and front of said sectionalized base,
   (c) a pair of power driven blades depending from the central base section for side-by-side rotation about spaced axes in opposite directions, the inner sides of both blades sweeping rearwardly,
   (d) a power driven blade depending from each side section, each of said blades rotating in the same direction as the nearest blade on the central base section,
   (e) a guide plate depending from the central base section on each side of an imaginary line extending between the blades on the central base section, said guide plates defining a central opening therebetween, said guide plates located at the rear of the central base section and slanted rearwardly as they extend away from said line, each of said guide plates terminating at an opening spaced from said central opening to laterally spread the grass thrust rearwardly between the axes of the blades on the central base section.

References Cited
UNITED STATES PATENTS

| | | | |
|---|---|---|---|
| 2,870,592 | 1/1959 | Swanson | 56—25.4 |
| 2,877,616 | 3/1959 | Gewalt et al. | 56—25.4 XR |
| 3,105,341 | 10/1963 | Crump | 56—192 |
| 3,157,014 | 11/1964 | Bottenberg | 56—6 |
| 3,208,207 | 9/1965 | Bottenberg | 56—25.4 |

RUSSELL R. KINSEY, Primary Examiner

U.S. Cl. X.R.

56—25.4